United States Patent
Hannay

[11] Patent Number: 5,871,174
[45] Date of Patent: Feb. 16, 1999

[54] FOILS

[76] Inventor: Ian Morton Hannay, Russets, Reading Road North, Fleet, Hants GU13 8HR, United Kingdom

[21] Appl. No.: 682,610
[22] PCT Filed: Jan. 30, 1995
[86] PCT No.: PCT/GB95/00185
    § 371 Date: Jul. 25, 1996
    § 102(e) Date: Jul. 25, 1996
[87] PCT Pub. No.: WO95/20521
    PCT Pub. Date: Aug. 3, 1995

[30] Foreign Application Priority Data
Jan. 28, 1994 [GB] United Kingdom ............... 9401691
[51] Int. Cl.$^6$ ........................................ B64C 3/10
[52] U.S. Cl. ............... 244/35 R; 244/45 R; 244/199
[58] Field of Search ............... 244/35 R, 34 R, 244/45 R, 199, 198, 300, 130

[56] References Cited

U.S. PATENT DOCUMENTS

| | | | |
|---|---|---|---|
| 2,038,337 | 4/1936 | Ballmann | 244/218 |
| 2,743,888 | 5/1956 | Lippisch. | |
| 2,858,091 | 10/1958 | Kapenkin | 244/218 |
| 3,369,775 | 2/1968 | Rethorst. | |
| 3,523,661 | 8/1970 | Rethorst | 244/199 |
| 4,046,336 | 9/1977 | Tangler. | |
| 4,180,224 | 12/1979 | Ryle, Jr. | 244/199 |

FOREIGN PATENT DOCUMENTS

| | | | |
|---|---|---|---|
| 0267023 | 5/1988 | European Pat. Off. | 244/199 |
| 1269496 | 5/1968 | Germany. | |
| 3127257 | 1/1983 | Germany. | |
| 404078793 | 3/1992 | Japan | 244/199 |
| 160134 | 8/1957 | Sweden | 244/199 |
| 1179568 | 1/1970 | United Kingdom. | |
| 9322196 | 11/1993 | WIPO. | |

OTHER PUBLICATIONS

A. MacKinnon, J.L. Stollery, "Wind Tunnel Tests On A Variable Camber Wing", College of Aeronautics Report No. 9304, Mar. 1993.

A.V. MacKinnon, "An Experimental Study Of A Variable Camber Wing (VCW)", Ph.D. Thesis, Cranfield Institute of Technology, Oct. 1993.

*Primary Examiner*—Galen L. Barefoot
*Attorney, Agent, or Firm*—Ostrolenk, Faber, Gerb & Soffen, LLP

[57] ABSTRACT

A method of reducing the effects of induced drag on a foil. A foil is provided with a series of steps along its span in the trailing edge, whereby a series of spaced vortices is generated. The spanwise spacing of the steps is selected so that the vortices are prevented from combining into a larger vortex at least until the aerodynamic effect of the larger vortex on the foil is insignificant.

12 Claims, 2 Drawing Sheets

FOILS

BACKGROUND OF THE INVENTION

1. Field of the Invention

This invention relates to foils and a method of reducing drag on a foil.

2. Brief Description of the Related Art

A foil to which this invention relates may be used on a lifting body on aircraft, missiles, ships, boats, vehicles and on any other equipment that uses any form of foil, including propellers, turbine and compressor blades and fans.

One of the main aims of foil research and development is to reduce drag, that is the resistant force acting in a direction opposite to the direction of the foil motion. Drag on a foil may be reduced by controlling the flow over the foil. This can be achieved using various forms of boundary layer control, for example surface finish, surface shape, various forms of vortex generator and boundary layer suction or blowing.

Further reductions may be achieved by reducing the effects of induced drag, which is associated with the development of lift, and results in the formation of a single vortex in the trailing flow from the foil. In conventional practice induced drag can be kept to a low value by providing a large ratio of foil length to foil width.

DE-A-3 127 257 discloses a method of reducing the induced drag of a lift generating aerofoil by disposing additional members at discrete positions on the wing in the region of free turbulent flow occurrence and using these members to generate artificial turbulent flows which have a direction of rotation opposed to the direction of rotation of the free turbulent flow. The additional members have a swirl generating adjustable air guidance system therein operable to vary the circulation or twist of air emerging therefrom. The intensity of the artificial turbulent flow is controlled so that it is at least approximately equal to that of the free turbulent flow in the same wing spread position. Hence, the artificial turbulent flow compensates for the free turbulent flow so that the induced drag on the foil is reduced to a minimum.

U.S. Pat. No. 3,369,775 discloses an aircraft wing system having means to overcome induced drag by providing a spanwise distribution of compensating trailing vortices equal in magnitude but opposite in sign to that produced by the wing lifting system. Several such means are disclosed, for example a spanwise distribution of vanes, ridges, grooves or fences may be provided on the surface of the wing itself. A jet flap system is also described. The function of the compensating vortices is to reduce or avoid the shedding of wing trailing vorticity, and thereby reduce the induced drag on the wing.

U.S. Pat. No. 2,743,888 discloses the provision of winglets at the tip of a wing for an aircraft, the winglets being designed to reduce the losses due to the tip vortex that is formed as a result of the airflow around the tip of the wing, by splitting the single tip vortex into a series of two or more vortices. It teaches the provision of retractable winglets in the leading edge of a delta wing at locations in the leading edge that are spaced apart in the spanwise direction along the leading edge. These are to be extended during take-off and landing and are to be retracted at other times such as cruise and in high speed flight. It is understood that these retractable winglets in the leading edge are proposed for splitting the detached vortex flow that would leave the wing from the leading edge during take-off and landing, the delta wing being designed to use vortex lift of which such detached vortex flow is a characteristic. Use of winglets at the tip of a wing, as proposed in U.S. Pat. No. 2,743,888, has been tested extensively and found not to reduce induced drag. Current theory suggests that this failure is a result of the fact that it is not possible to effectively prevent a single tip vortex from forming, in other words that the winglets do not achieve the purpose of splitting the tip vortex for which they were provided.

SUMMARY OF THE INVENTION

The present invention reduces the effects of drag by using a new foil with features specifically designed to reduce induced drag and using potential or conventional lift, these features being selected as a result of the realisation that, contrary to popular belief, it is possible to delay the formation of a single large tip vortex at least until the aerodynamic effect of the larger vortex on the foil is less significant.

According to the present invention there is provided a method of reducing drag on a foil when it is moving relative to a fluid which involves splitting flow trailing the foil into a series of two or more vortices by providing aerodynamic discontinuities at locations spaced along the span of the foil, characterised in that the method involves so splitting flow which leaves the foil at its trailing edge during motion of the foil by such aerodynamic discontinuities which are provided at locations in the trailing edge which are spaced along the span of the foil so that the vortices, into which the flow that leaves the foil at its trailing edge is split, trail the foil spaced from one another in the spanwise direction relative to the foil.

In carrying out a method according to this aspect of this invention, the spanwise spacing of the locations at which the flow leaving the trailing edge of the foil is split is arranged in relation to the lift of the foil such that the vortices trail the foil and do not combine into a larger vortex at least until the aerodynamic effect of such a larger vortex on the foil would be less significant.

BRIEF DESCRIPTION OF THE DRAWINGS

The invention will now be described by way of example only with reference to the accompanying drawings, in which.

DETAILED DESCRIPTION OF THE PREFERRED EMBODIMENTS

Figure 1:
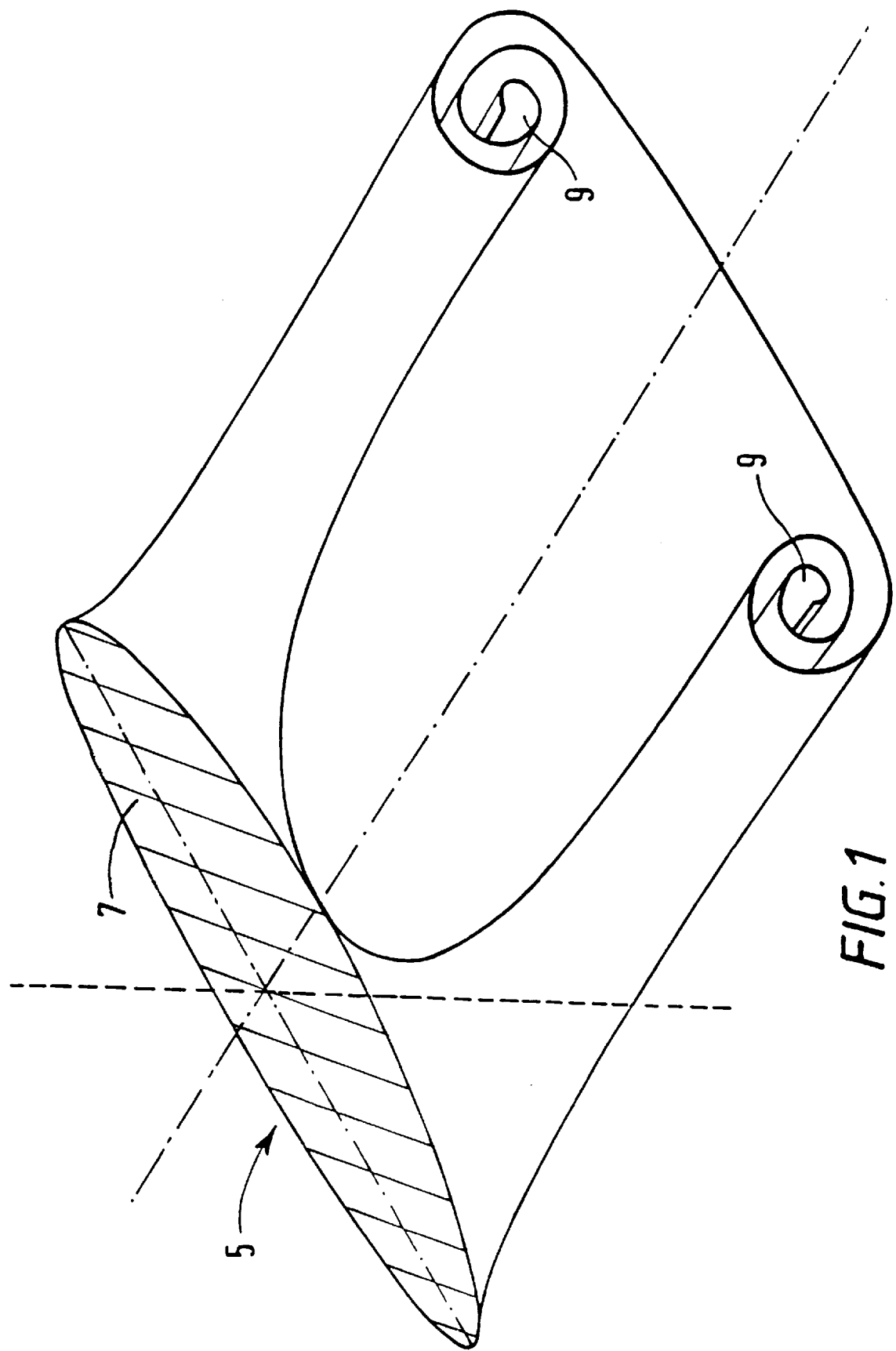
FIG. 1 is a diagrammatic illustration of the trailing vortex pattern formed by a conventional wing.

FIG. 1 shows a conventional elliptical wing 5 comprising two semi-elliptical foils 7. Foils of this type develop a series of small vortices when there is air or fluid flow around the foil. These vortices combine at around 78% of the foil span, to form a single large vortex 9. The further the cores of the two large vortices 9 are apart, and the weaker they are, the less is the induced drag on the wing.

Figure 2:
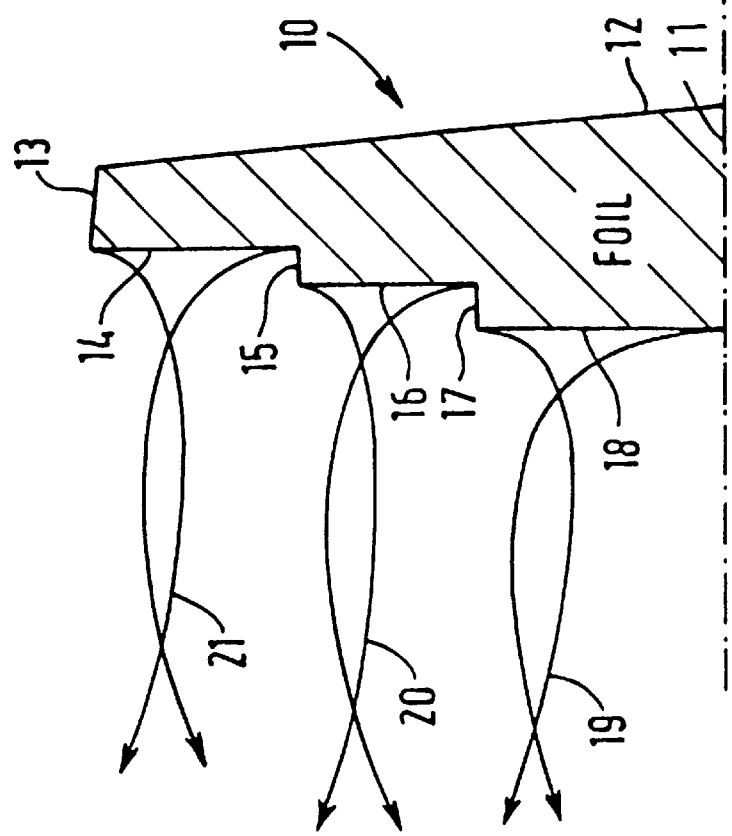
FIG. 2 is a diagrammatic illustration of the trailing vortex pattern formed by a foil embodying this invention.

FIG. 2 shows a foil 10 having a root or centerline, a smooth on fair leading edge 12, a tip 13 and a stepped trailing edge. A large acute angle is included between the leading edge 12 and the root or centerline 11. The tip 13 diverges from the root or centerline 11 at a shallow angle away from the leading edge 12. The stepped trailing edge comprises edges 14 to 18, there being two edges 15 and 17 opposite to and substantially parallel to the root or centerline 11 and three edges 14,16 and 18 opposite the leading edge 12 and substantially normal to the root or centerline 11.

These edges 14 to 18 are arranged alternately so that there is a series of steps in the trailing edge at spanwise-spaced intervals from the end of the tip 13 furthest from the root or centerline 11 to the end of the root or centerline 11 furthest from the leading edge 12.

The steps in the trailing edge of the foil 10 create a series of discrete sub-foils, each step forming an aerodynamic discontinuity, so that when fluid flows around the foil 10 the induced drag is not that due to the effect- of one vortex being formed in the flow trailing from the foil, but that resulting from the sum of the drag due to individual discrete vortices 19, 20, 21 formed in the trailing flow, as a result of each sub-foil the vortices being formed substantially at the trailing edge, as shown in FIG. 2. A foil of this type has discontinuities in the lift distribution across a span of the foil.

It is believed the provision of aerodynamic discontinuities at spanwise intervals along the foil which are effective in all flight modes, including cruise, leads to a vortex forming arrangement which is more evenly distributed over the span of the wing in all flight modes as compared with the vortex forming arrangement of a conventional wing in which a dominant vortex is formed by the tip and which leads to the establishment of the single large vortex. With this more evenly distributed arrangement, the individual vortices remain separate at least until the aerodynamic effect on the foil of a larger vortex formed by their combination would be less significant. The spanwise spacing of the aerodynamic discontinuities necessary to achieve effective vortex separation so that the vortices formed by the discontinuities will remain separate sufficiently aft of the foil to reduce the effect on the foil of induced drag, is a function of the lift of the foil and the intensity of the individual vortices. The latter is directly proportional of the square of the lift. Hence it is believed that the spanwise spacing of discontinuities needs to be increased with the square of any increase in the lift or the number of spaced discontinuities should be increased. Obviously there is a limit to the number of discontinuities that may be accommodated because of the need for there to be an effective spanwise spacing between juxtaposed discontinuities.

In one embodiment of the invention the individual vortices, formed as a result of the aerodynamic discontinuities, are all of substantially the same magnitude.

The interval between each adjacent pair of steps, and thus between each adjacent pair of discontinuities, may decrease progressively from the tip of the foil to the root. In such an arrangement, each interval may be approximately 20% of the distance from the further of its two steps to the centerline or root. Alternatively, the interval between each adjacent pair of steps, and thus between each adjacent pair of discontinuities may increase progressively from the tip of the foil to the root.

The aerodynamic discontinuities may be created using and plates or flaps or sucking or blowing means or vortex generators, or may be formed as an integral part of the wing. In general, an aerodynamic discontinuity occurs at the trailing edge when there is a difference in the trailing edge on either side of the discontinuity. This may be due to various structural features and not just a step as previously described. For example, it could be due to there being a twist in the trailing edge in the region at which the discontinuity is located.

Figure 3:
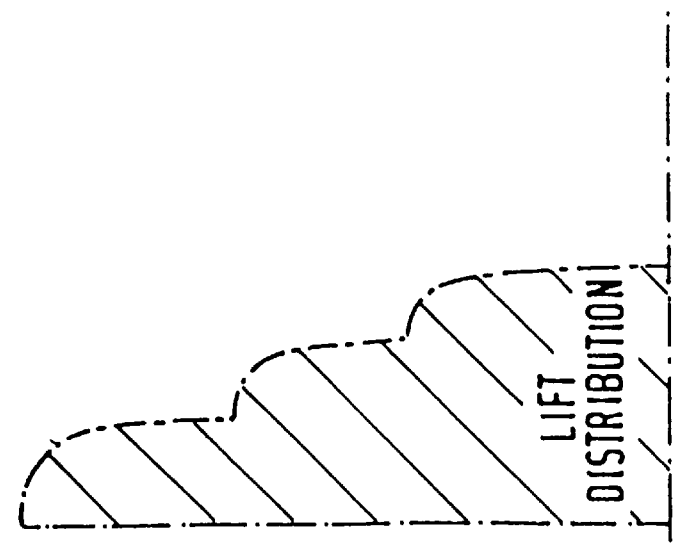
FIG. 3 is a diagrammatic illustration of the lift distribution across the foil shown in FIG. 2.

The overall trend is for the lift to increase from the tip of the foil towards the centerline or root. This increase is not continuous or smooth but instead is characterised by a series of discontinuous steps as is shown by way of example in FIG. 3.

Although the present invention has been described in relation to particular embodiments thereof, many other variations and modifications and other uses will become apparent to those skilled in the art. Therefore, the present invention is to be limited not by the specific disclosure herein, but only by the appended claims.

I claim:

1. A method of reducing drag on a foil, the foil having a smooth leading edge and a trailing edge, when the foil is moving relative to a fluid, the method comprising splitting flow trailing the foil into a series of at least two vortices spaced along the span of the foil, comprising splitting the flow which leaves the trailing edge of the foil during motion of the foil by providing aerodynamic discontinuities at locations in the trailing edge which are spaced along the span of the foil and which are effective for so splitting flow during all modes of such motion of the foil, so that the vortices, into which the flow that leaves the foil at its trailing edge is split, trail the foil spaced from one another in the spanwise direction relative to the foil during all modes of such motion of the foil, and the vortices formed by the discontinuities remain separate sufficiently aft of the foil to reduce the effect on the foil of induced drag.

2. A method according to claim 1, including providing aerodynamic discontinuities at said locations spaced along the span of the foil so that there is a stepped increase in the foil lift at each location and the pattern of increased lift increases in steps towards the center of the foil.

3. A method according to claim 1, wherein the intervals between adjacent locations at which the flow is split vary.

4. A method according to claim 3, wherein the intervals are reduced progressively away from the tip of the foil.

5. A method according to claim 3, wherein the intervals are increased progressively away from the tip of the foil.

6. A method according to claim 1, wherein the locations are such that each of the vortices formed is of similar magnitude.

7. A foil having a span and having a smooth leading edge and a trailing edge and including aerodynamic means at spaced intervals along the span, which are operable to split flow leaving the foil, when the foil is moving relative to a fluid, into two or more vortices which start substantially at the trailing edge, the aerodynamic means comprising discontinuities which are formed at spaced intervals along the span of the trailing edge of the foil and which are operable to split flow leaving the trailing edge of the foil during all modes of operation of the foil, the number and nature of the discontinuities and their spacing being selected such that the vortices into which flow leaving the trailing edge of the foil during all modes of operation of the foil is split, trail the foil spaced from one another in the spanwise direction relative to the foil, and the vortices formed by the discontinuities remain separate sufficiently aft of the foil to reduce the effect on the foil of induced drag.

8. A foil according to claim 7, wherein the discontinuities are operable to effect a stepped change or discontinuity in the lift at each of the spaced intervals.

9. A foil according to claim 7, wherein the aerodynamic means comprise end plates.

10. A foil according to claim 7, wherein said aerodynamic means comprise vortex generators.

11. A foil according to claim 7, wherein the aerodynamic means are formed as an integral part of the foil.

12. A foil according to claim 7, wherein the aerodynamic means are added to the foil.

* * * * *